US009208574B2

(12) United States Patent
Kim et al.

(10) Patent No.: US 9,208,574 B2
(45) Date of Patent: Dec. 8, 2015

(54) METHOD AND APPARATUS FOR MEASURING ROTATION CHARACTERISTICS OF ROTATING BODY

(75) Inventors: Jong Sung Kim, Daejeon (KR); Seong Min Baek, Daejeon (KR); Myung Gyu Kim, Daejeon (KR); Il Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 539 days.

(21) Appl. No.: 13/620,457

(22) Filed: Sep. 14, 2012

(65) Prior Publication Data

US 2013/0135466 A1    May 30, 2013

(30) Foreign Application Priority Data

Nov. 25, 2011 (KR) .................. 10-2011-0124582

(51) Int. Cl.
| | | |
|---|---|---|
| G06K 9/52 | (2006.01) | |
| G06T 7/20 | (2006.01) | |
| G06K 9/46 | (2006.01) | |
| A63B 69/36 | (2006.01) | |
| A63B 37/00 | (2006.01) | |

(52) U.S. Cl.
CPC ........... *G06T 7/2033* (2013.01); *A63B 37/0022* (2013.01); *A63B 69/3658* (2013.01)

(58) Field of Classification Search
CPC .................................. G06T 7/20; G01N 21/00
USPC ......... 382/103, 108, 181, 173, 194, 201, 225, 382/274
See application file for complete search history.

(56) References Cited

U.S. PATENT DOCUMENTS

| | | | | |
|---|---|---|---|---|
| 6,137,528 | A  * | 10/2000 | Ashizaki .................. | 348/86 |
| 7,324,663 | B2 | 1/2008 | Kiraly | |
| 2005/0069173 | A1* | 3/2005 | Morisada et al. ............ | 382/103 |
| 2005/0233816 | A1 | 10/2005 | Nishino et al. | |
| 2007/0060410 | A1* | 3/2007 | Gobush .................. | 473/140 |
| 2007/0213139 | A1 | 9/2007 | Stivers et al. | |
| 2010/0210377 | A1 | 8/2010 | Lock | |

FOREIGN PATENT DOCUMENTS

KR    100871595 B1    11/2008

OTHER PUBLICATIONS

Giacomo Boracchi et al., "Single-Image 3D Reconstruction of Ball Velocity and Spin from Motion Blur", VISAPP 2008 (3rd International Conference on Computer Vision Theory and Applications), Jan. 22-25, 2008.

* cited by examiner

*Primary Examiner* — Sath V Perungavoor
*Assistant Examiner* — Clifford Hilaire

(57) ABSTRACT

Disclosed are a method and apparatus for measuring rotation characteristics such as rotation rate, rotation axis, and rotation angle of a rotating body. A method of measuring rotation characteristics includes extracting a rotating-body region from an image of the rotating body; extracting a surface pattern of the rotating body on the basis of brightness values of the extracted rotating-body region and acquiring rotation characteristics of the rotating body on the basis of change in the extracted surface pattern. Accordingly, it is possible to accurately measure rotation characteristics regardless of variation in brightness values of a surface region of the rotating body depending on illumination of a lamp, sensitivity of a camera, and exposure time of a camera.

13 Claims, 8 Drawing Sheets

(A)  (B)

METHOD AND APPARATUS FOR MEASURING ROTATION CHARACTERISTICS OF ROTATING BODY

CLAIM FOR PRIORITY

This application claims priority to Korean Patent Application No. 10-2011-0124582 filed on Nov. 25, 2011 in the Korean Intellectual Property Office (KIPO), the entire contents of which are hereby incorporated by reference.

BACKGROUND

1. Technical Field

Example embodiments of the present invention relate in general to measuring rotation characteristics of a rotating body, and more specifically, to a method and apparatus for measuring rotation characteristics such as a rotation rate, a rotation axis, and a rotation angle.

2. Related Art

In general, a method of measuring a rotation rate of a rotating body with a camera is used in the field of virtual sports games using a simulation of rotational motion, such as a golf, baseball, soccer, or tennis game. A conventional method of measuring a rotation rate of a rotating body includes extracting a surface region of the rotating body from an image photographed with a camera, and measuring the rotation rate of the rotating body directly using the extracted surface region.

This method has problems in that many errors occur because the rotation rate of the rotating body is directly measured using the extracted surface region though brightness values of pixels in the surface region of the rotating body vary depending on illumination of a lamp, sensitivity of a camera, and exposure time of a camera in addition to the rotation rate.

SUMMARY

Accordingly, example embodiments of the present invention are provided to substantially obviate one or more problems due to limitations and disadvantages of the related art.

Example embodiments of the present invention provide a method of accurately measuring the rotation rate of a rotating body.

Example embodiments of the present invention also provide an apparatus for accurately measuring the rotation rate of the rotating body.

Example embodiments of the present invention also provide a system for accurately measuring the rotation rate of the rotating body.

In some example embodiments, a method of measuring rotation characteristics includes extracting a rotating-body region from an image of the rotating body, extracting a surface pattern of the rotating body on the basis of brightness values of the extracted rotating-body region, and acquiring rotation characteristics of the rotating body on the basis of change in the extracted surface pattern.

The extracting of the surface pattern may include normalizing a brightness range of the rotating region on the basis of a minimum brightness value and a maximum brightness value among brightness values of pixels included in the extracted rotating-body region, and extracting the surface pattern of the rotating body on the basis of the results of comparing brightness values of the normalized rotating-body region.

The extracting of the rotating-body region may include extracting a pixel cluster of the rotating-body region from the image of the rotating body, estimating a center and radius of the rotating body on the basis of the extracted pixel cluster, and extracting the rotating-body region on the basis of the estimated center and radius of the rotating body.

The estimating of the center and radius of the rotating body may be performed using a Hough transform-based circle fitting technique.

The normalizing of the brightness range of the rotating-body region may be performed on the basis of the minimum brightness value and the maximum brightness value among brightness values of the pixels such that the each pixel in the extracted rotating-body region has a brightness value ranging from 0 to 255.

The extracting of the surface pattern may include creating an integration image by adding brightness values of pixels included in a certain portion of the normalized rotating-body region, and calculating a brightness comparison value and a brightness average value of the pixels included in the normalized rotating-body region using the created integration image, to extract the surface pattern of the rotating body on the basis of the calculated brightness comparison value and brightness average value.

The acquiring of the rotation characteristics may include estimating a range of the rotation angle on the basis of change in the extracted surface pattern, calculating a rotation matrix on the basis of any rotation angle within the estimated range of the rotation angle, calculating a rotation angle having a minimum value of a cost function within the estimated range of the rotation angle on the basis of the rotation matrix, and acquiring rotation characteristics of the rotating body on the basis of the calculated rotation angle.

The rotation characteristics may include at least one of top spin, back spin, side spin, rifle spin, a rotation axis, and a rotation angle of the rotating body.

In other example embodiments, an apparatus for measuring rotation characteristics includes a region extraction unit estimating a center and radius of a photographed rotating body from an image of the rotating body, and extracting a rotating-body region on the basis of the estimated center and radius, a pattern extraction unit extracting a surface pattern of the rotating body on the basis of brightness values of the extracted rotating-body region, and a measurement unit acquiring rotation characteristics of the rotating body on the basis of change in the extracted surface pattern.

The apparatus may further include a normalization unit normalizing a brightness range of the rotating-body region on the basis of a minimum brightness value and a brightness value among brightness values of pixels in the extracted rotating-body region, in which the pattern extraction unit may extract the surface pattern of the rotating body on the basis of brightness comparison results of the normalized rotating-body region.

The region extraction unit may extract a pixel cluster of the rotating-body region from the image of the rotating body, estimate a center and radius of the rotating body on the basis of the extracted pixel cluster, and extract the rotating-body region on the basis of the estimated center and radius of the rotating body.

The pattern extraction unit may create an integration image by adding brightness values of pixels included in a certain portion of the normalized rotating-body region, calculate a brightness comparison value and a brightness average value of the pixels included in the normalized rotating-body region using the created integration image, and extract the surface pattern of the rotating body on the basis of the calculated brightness comparison value and brightness average value.

The measurement unit may estimate a range of the rotation angle on the basis of change in the extracted surface pattern, calculate a rotation matrix on the basis of any rotation angle within the estimated range of the rotation angle, calculate a rotation angle having a minimum value of a cost function within the estimated range of the rotation angle on the basis of the rotation matrix, and acquire rotation characteristics of the rotating body on the basis of the calculated rotation angle.

In still other example embodiments, a system for measuring rotation characteristics includes a photographing unit acquiring a plurality of images of a rotating body, and an apparatus for measuring rotation characteristics extracting a rotating-body region from the acquired rotating body image, extracting a surface pattern of the rotating body on the basis of brightness values of the extracted rotating-body region, and acquiring rotation characteristics of the rotating body on the basis of the surface pattern of the extracted rotating body.

The photographing unit may acquire the plurality of images at a certain interval.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
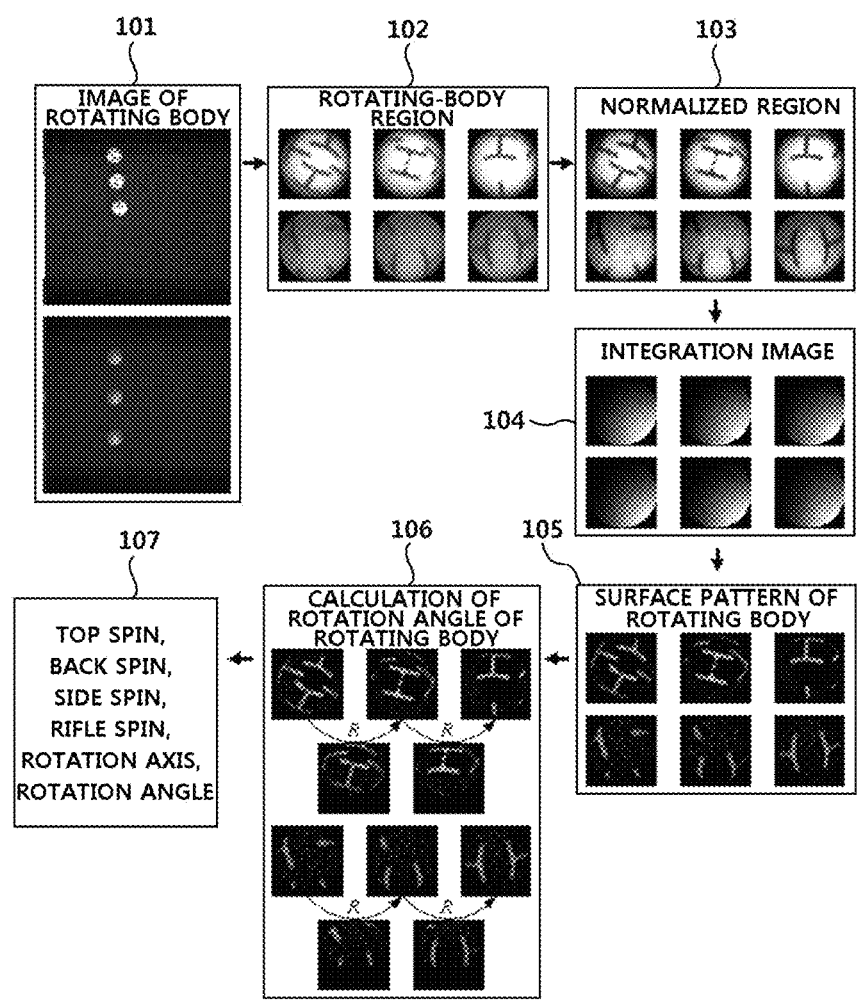
FIG. 1 is a concept view showing a process of measuring rotation characteristics of a rotating body.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention.

In the following description, the technical terms are used only for explaining a specific exemplary embodiment while not limiting the present invention. The terms of a singular form may include plural forms unless referred to the contrary. The meaning of 'comprises' and/or 'comprising' specifies a property, a region, a fixed number, a step, a process, an element and/or a component but does not exclude other properties, regions, fixed numbers, steps, processes, elements and/or components.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

FIG. 1 is a concept view showing a process of measuring rotation characteristics of a rotating body.

Hereinafter, the method of measuring rotation characteristics will be described with reference to FIG. 1. First, a rotating-body region 102 is extracted from an image 101 of a rotating body through a certain process. The extracted rotating-body region 102 is normalized to have a brightness value ranging from 0 to 255. An integration image 104 for the rotating-body region 102 or the normalized rotating-body region 103 is created. A brightness comparison value or brightness average value of pixels included in the rotating-body region 102 or the normalized rotating-body region 103 is calculated using the generated integration image 104. A surface pattern 105 of the rotating body is extracted on the basis of the calculated brightness comparison value or brightness average value of pixels. A rotation angle 106 is calculated on the basis of the extracted surface pattern 105 of the rotating body. Rotation characteristics 107 such as top spin, back spin, side spin, rifle spin, rotation axis, rotation angle, etc. of the rotating body are acquired using the calculated rotation angle of the rotating body.

Figure 2:
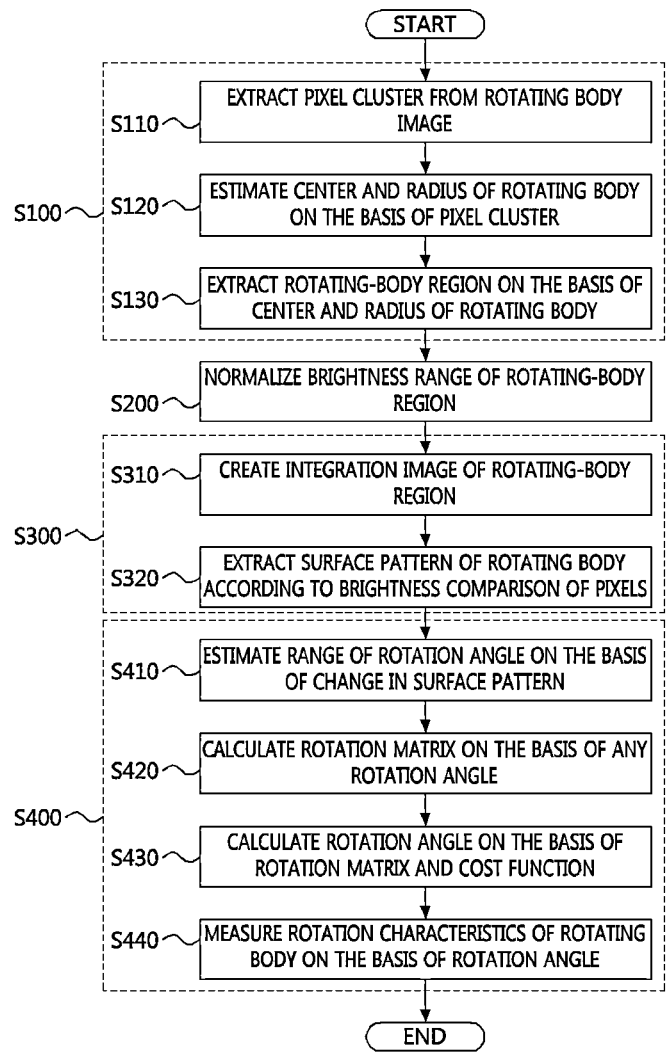
FIG. 2 is a flowchart illustrating a method of measuring rotation characteristics of the rotating body according to an embodiment of the present invention.
Figure 3:
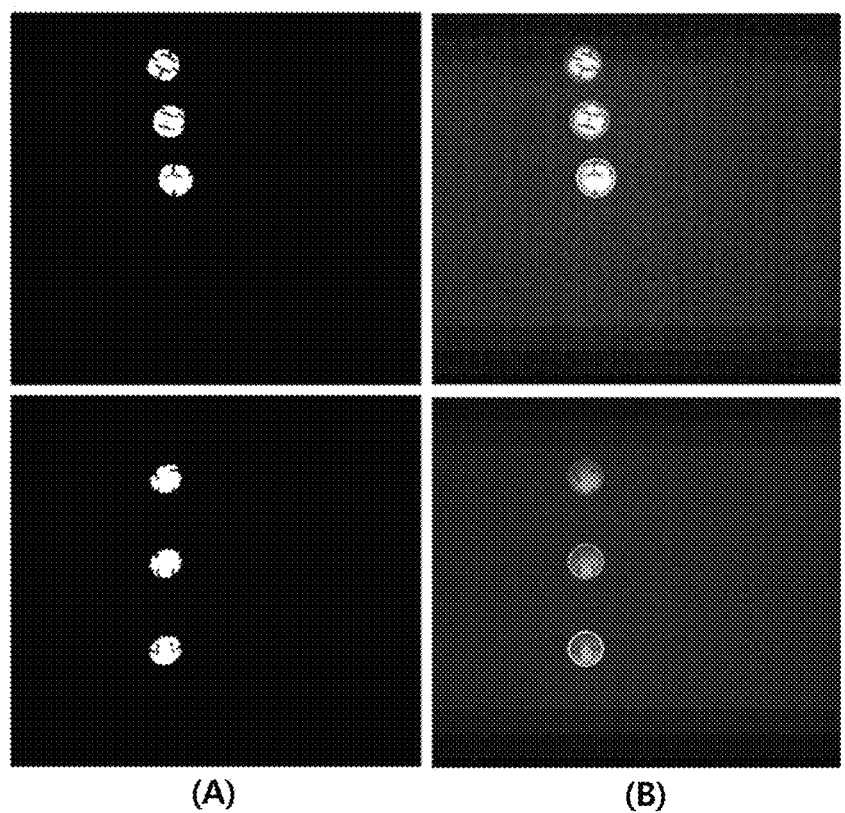
FIG. 3 is a concept view showing a surface image of the rotating body.
Figure 4:
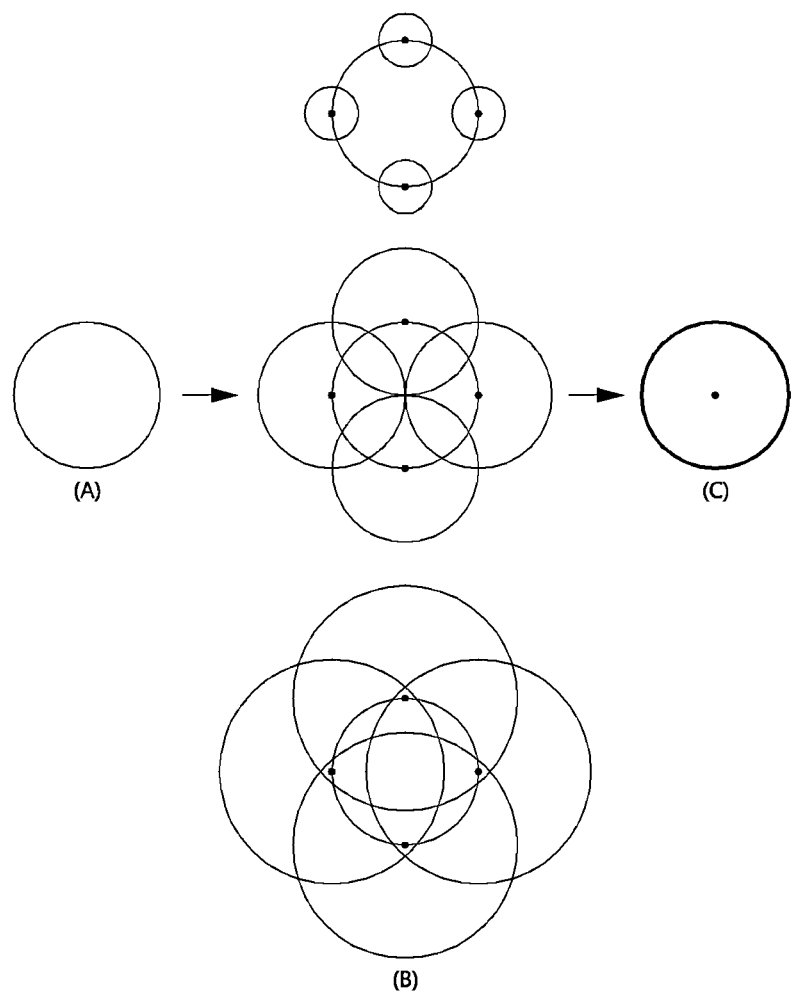
FIG. 4 is a concept view showing a process of applying a Hough transform-based circle fitting technique.
Figure 5:
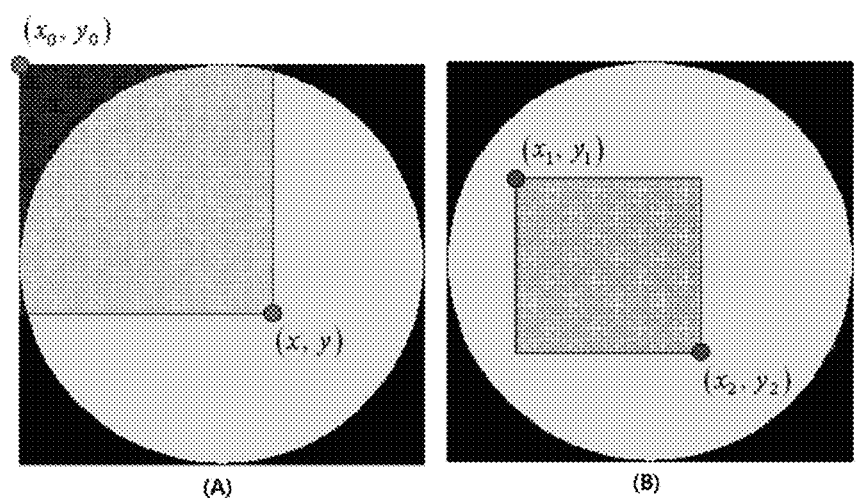
FIG. 5 is a concept view showing a process of creating an integration image.
Figure 6:
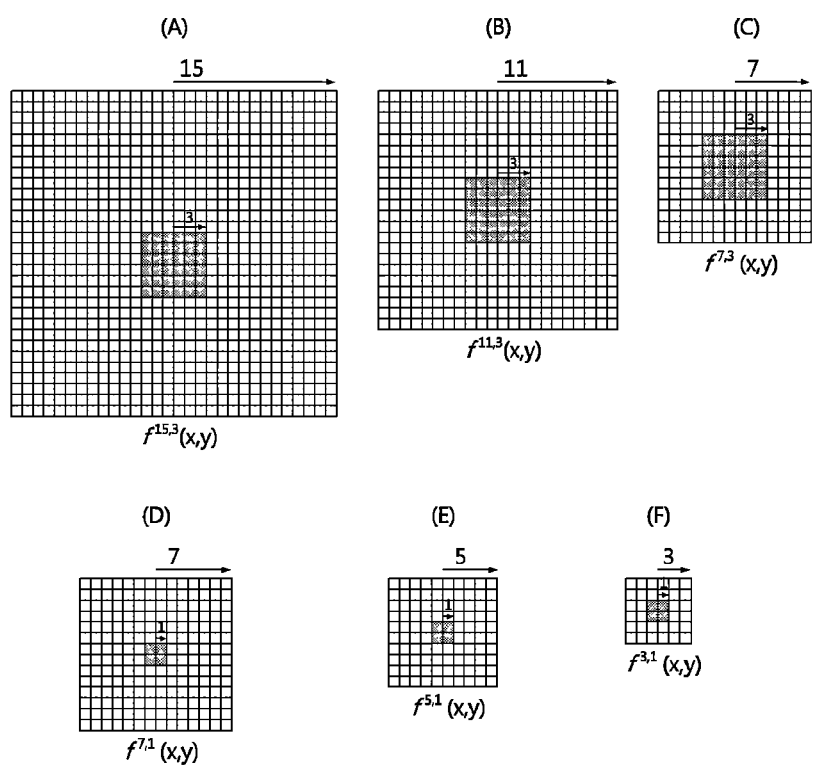
FIG. 6 is a concept view showing a process of extracting a surface pattern of the rotating body.
Figure 7:
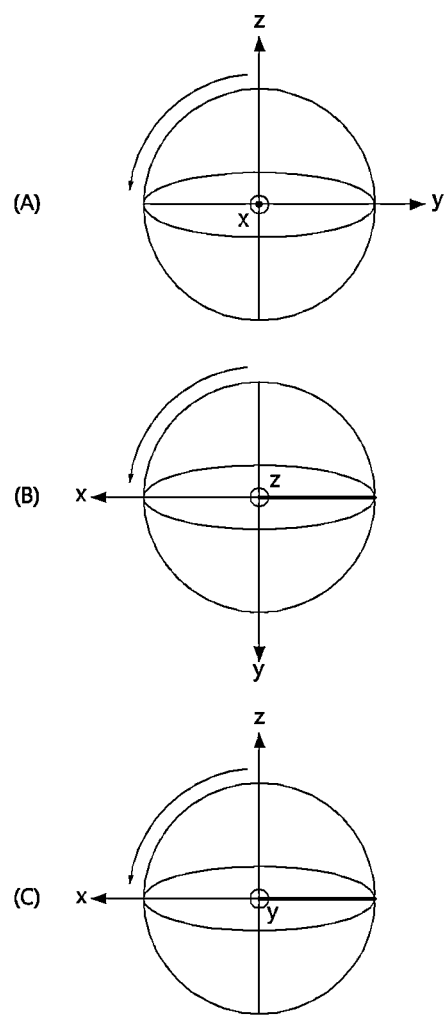
FIG. 7 is a concept view showing different kinds of spins according to a rotation direction of the rotating body.

FIG. 2 is a flowchart illustrating a method of measuring rotation characteristics of the rotation body according to an embodiment of the present invention. FIG. 3 is a concept view showing a surface image of the rotating body. FIG. 4 is a concept view showing a process of applying a Hough transform-based circle fitting technique. FIG. 5 is a concept view showing a process of creating an integration image. FIG. 6 is a concept view showing a process of extracting a surface pattern of the rotating body. FIG. 7 is a concept view showing different kinds of spins according to a rotation direction of the rotating body.

Referring to FIG. 2, the method of measuring rotation characteristics of the rotating body includes extracting the rotating-body region from the photographed image of the rotating body (S100), extracting the surface pattern of the rotating body on the basis of brightness comparison results of the extracted rotating-body region (S300), and measuring rotation characteristics of the rotating body on the basis of change in the extracted surface pattern (S400). Also, the method further includes normalizing the brightness range of the extracted rotating-body region (S200).

Operation S100 may include extracting a pixel cluster for the rotating-body region in the image of the rotating body (S110), estimating a center and radius of the rotating body on the basis of the pixel cluster (S120), and extracting the rotating-body region on the basis of the center and radius of the rotating body (S130). Here, the pixel cluster means a set of pixels included in the rotating-body region.

In operation S110, the pixel cluster is extracted from the image of the rotating body. A variety of conventional methods may be used to extract the pixel cluster from the image of the rotating body. Preferably, an area filtering technique, a connected component labeling technique, and a background subtraction technique based on probability distribution may be used, which are disclosed in Korean patent application No. 2011-0057806 applied by the applicant. FIG. 3A shows the pixel cluster of the rotating body, which is extracted in operation S110.

In operation S120, the center and radius of the rotating body are estimated on the basis of the pixel cluster. For this, a Hough transform-based circle fitting technique may be used.

Referring FIG. 4, (a) indicates the rotating body, (b) indicates a process of estimating the center and radius of the rotating body, and (c) indicates the rotating body having the estimated center and radius. To provide a more detailed description, each circle is drawn with its center being any pixel located on a boundary of the rotating body and its radius. Then, while their radii are gradually increased, the drawn circles are determined whether to create an intersection point. If all of the drawn circles create the intersection point, this point is estimated to be the center of the rotating body, and the radius of the drawn circle is estimated to be the radius of the rotating body.

In operation S130, the boundary of the rotating body may be estimated using the estimated center and radius of the rotating body, and the inside of the estimated boundary of the rotating body may be extracted as the rotating-body region. FIG. 3B shows the surface region of the rotating body, which is extracted in operation S130.

In operation S200 of normalizing the brightness range of the rotating-body region on the basis of a minimum brightness value and a maximum brightness value among brightness values of pixels in the rotating-body region extracted in operation S100, the brightness range of the rotating-body region may be normalized on the basis of the minimum brightness value and maximum brightness value among the brightness values of the pixels in the rotating-body region such that the pixels in the rotating-body region have brightness values ranging from 0 to 255.

$$G(x, y) = \frac{g(x, y) - g_{min}}{g_{max} - g_{min}} \times 255 \quad \text{Equation 1}$$

In operation S200, the brightness range of the rotating-body region may be normalized, where G(x, y) is a brightness value of a pixel located at coordinate (x, y) in the normalized rotating-body region, g(x, y) is a brightness value of a pixel located at coordinate (x, y) in the rotating-body region, $g_{max}$ is a maximum brightness value in the rotating-body region, and $g_{min}$ is a minimum brightness value in the rotating-body region.

In operation S300, which is an operation of extracting the surface pattern of the rotating body, the surface pattern of the rotating body may be extracted on the basis of the rotating-body region extracted in operation S100, and the surface pattern of the rotating body may be extracted on the basis of the normalized rotating-body region extracted in operation S100.

Operation S300 may include creating an integration image of the rotating-body region or the normalized rotating-body region (S310), and extracting the surface pattern of the rotating body on the basis of the results of comparing brightness values in the rotating-body region or the normalized rotating-body region (S320). In operation S320, the surface pattern may be extracted with a filter for calculating a result value according to the brightness comparison between the pixels.

In operation S310, the integration image is created by adding brightness values of pixels in a certain portion of the rotating-body region or the normalized rotating-body region.

$$I(x, y) = \sum_{u=x_0}^{x} \sum_{v=y_0}^{y} G(u, v) \quad \text{Equation 2}$$

In operation S310, the integration image for the certain portion may be created using equation 2. Referring to FIG. 5A, coordinate $(x_0, y_0)$ is a coordinate of a specific point outside the surface region, I(x, y) is a value obtained by adding brightness values of all pixels located in a region from coordinate $(x_0, y_0)$ to coordinate (x, y).

$$D(x_1,y_1,x_2,y_2)=I(x_2,y_2)-I(x_2,y_1-1)-I(x_1,y_2)+I(x_1-1, y_1-1) \quad \text{Equation 3}$$

In operation S310, the integration image for the certain portion of the rotating-body region or the normalized rotating-body region may be created using equation 3. Referring to FIG. 5B, $D(x_1, y_1, x_2, y_2)$ is a value obtained by adding brightness values of all pixels located in a region from coordinate $(x_1, y_1)$ to coordinate $(x_2, y_2)$.

In operation S320, the surface pattern of the rotating body is calculated reflecting the integration thereon when the filter is applied to calculate a result value according to comparison of brightness values of pixels. In this case, an off-center cell filtering in equation 4 may be used as the filter.

$$P(x, y) = \begin{cases} \dfrac{f_{max}(x, y) \times (S(x, y) + 255)}{S(x, y) + f_{max}(x, y)} & \text{if } f_{max}(x, y) > 0 \\ 0 & \text{o.w.} \end{cases} \quad \text{Equation 4}$$

In operation S320, the surface pattern may be calculated using equation 4, where P(x, y) is the surface pattern of the rotating body at coordinate (x, y), $f_{max}(x, y)$ is a maximum brightness comparison value which may be calculated using equation 5, and S(x, y) is an average brightness value of pixels located in a certain region centered around coordinate (x, y) which may be calculated using equation 6.

$$f_{max}(x, y) = \max \begin{Bmatrix} f^{15,3}(x, y), f^{11,3}(x, y), f^{7,3}(x, y), \\ f^{7,1}(x, y), f^{5,1}(x, y), f^{3,1}(x, y) \end{Bmatrix} \quad \text{Equation 5}$$

$$f^{k,l}(x, y) = S^k(x, y) - S^l(x, y) \quad \text{Equation 6}$$

$$= \begin{Bmatrix} \dfrac{1}{(2k+1)^2} D(x-k, y-k, x+k, y+k) - \\ \dfrac{1}{(2l+1)^2} D(x-l, y-l, x+l, y+l) \end{Bmatrix}$$

Variables of equations 5 and 6 will be described below with reference to FIG. 6. Referring to FIG. 6A, $f^{15,3}(x, y)$ is a difference between a brightness average value of pixels located in a region having a center of coordinate (x, y) and a size of 15×15 and a brightness average value of pixels located in a region having a center of coordinate (x, y) and a size of 3×3. Also, referring to FIG. 6B, $f^{11,3}(x, y)$ is a difference between a brightness average value of pixels located in a region having a center of coordinate (x, y) and a size of 15×15 and a brightness average value of pixels located in a region having a center of coordinate (x, y) and a size of 3×3. $f^{7,3}(x, y)$, $f^{7,1}(x, y)$, $f^{5,1}(x, y)$, and $f^{3,1}(x, y)$ may be calculated in the same method as the above mentioned method.

Operation S400 may include estimating a range of the rotation variable on the basis of change in the surface pattern (S410), calculating a rotation matrix on the basis of any rotation variable (S420), calculating the rotation variable on the bases of the rotation matrix and a cost function (S430), and measuring rotation characteristics of the rotating body on the basis of the rotation variable (S440).

In operation S410, the range of the rotation variable (herein, a rotation angle) is estimated on the basis of change in the surface pattern extracted in operation S300, and the rough range of the rotation variable is estimated on the basis of the radius of the rotating body and movement length of the surface pattern. Herein, the rotation variable includes $\phi$, $\theta$, and $\Psi$. $\phi$ is an angle rotated with respect to X-axis in a three-dimensional coordinate system, $\theta$ is an angle rotated with respect to Y-axis in the three-dimensional coordinate system, and $\psi$ is an angle rotated with respect to Z-axis. The range of rotation variable $\phi$ may be estimated as $\phi \in [-\alpha, +\alpha]$. The range of rotation variable $\theta$ may be estimated as $\theta \in [-\beta, +\beta]$. The range of rotation variable $\Psi$ may be estimated as $\Psi \in [-\gamma, +\gamma]$. That is, rotation variables $\phi$, $\theta$, and $\Psi$ are any values within the ranges, respectively, not constant values.

$$R = \begin{pmatrix} r_{11} & r_{12} & r_{13} \\ r_{21} & r_{22} & r_{23} \\ r_{31} & r_{32} & r_{33} \end{pmatrix} \quad \text{Equation 7}$$

$$= \begin{pmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\sin\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{pmatrix}$$

In operation S420, a rotation matrix R may be calculated using equation 7, where the rotation values $\phi$, $\theta$, and $\psi$ are any values within the ranges estimated in operation S410, respectively.

In operation S430, a rotation variable having a minimum value of the cost function within the range estimated in operation S410 is calculated on the basis of the rotation matrix calculated in operation S420. Referring to FIG. 7, a result of substituting $\phi$ within the range $[-\alpha, +\alpha]$ for x in a cost function f(x) is shown. In this case, a rotation variable $\phi^*$ is calculated which corresponds to a minimum value among the result values of the cost function f(x).

$$\phi^*, \psi^*, \theta^* = \min C(\phi, \psi, \theta) \quad \text{Equation 8}$$

$$= \min \sum_{i=1}^{2} (P_i(x, y) - P_{i+1}(r_{11}x + r_{12}y + r_{12}z,$$

$$r_{21}x + r_{22}y + r_{22}z))^2$$

In operation S430, the rotation variable having the minimum value of the cost function may be calculated using equation 8. In equation 8, a result is calculated by substituting $\phi$, $\psi$, and $\theta$ values within the ranges for the cost function $C(\phi, \psi, \theta)$, and the rotation variables $\phi^*$, $\psi^*$, and $\theta^*$ are calculated which are minimum values among the result values of the cost function $C(\phi, \psi, \theta)$.

Here, $\phi^*$ is a value having a minimum value of the cost function within the range of $\phi$ (for example, $\phi \in [-\alpha, +\alpha]$). $\theta^*$ is a value having the minimum value of the cost function within the range of $\theta$ (for example, $\theta \in [-\beta, +\beta]$). $\Psi^*$ is a value having the minimum value of the cost function within the range of $\Psi$ (for example, $\Psi \in [-\gamma, +\gamma]$). Pi(x, y) may be calculated using equation 4.

If it is assumed that the transformation relation between a three-dimensional coordinate system and a two-dimensional coordinate system is orthographic projection, coordinate z of the z-axis in the three-dimensional coordinate system may be calculated using equation 9. Here, r is a radius of the rotating body.

$$z = \sqrt{r^2 - x^2 - y^2} \quad \text{Equation 9}$$

In operation S440, rotation characteristics of the rotating body are calculated on the basis of the rotation variable having the minimum value of the cost function calculated in S430. Here, the rotation characteristics may include top spin, back spin, side spin, rifle spin, rotation axis, and rotation angle.

FIG. 7 is a concept view showing different kinds of spins according to a rotation direction of the rotating body. In a three-dimensional coordinate system having x-axis and y-axis which are parallel with the ground, and z-axis which is perpendicular to the ground, the y-axis is assumed to represent an initial traveling direction of the rotating body, the x-axis is assumed to represent a direction perpendicular to the initial traveling direction of the rotating body, and z-axis is assumed to represent a direction perpendicular to the initial traveling direction of the rotating body. FIG. 7A shows the rotating body rotating around x-axis, which represents the top spin or back spin. FIG. 7B shows the rotating body rotating around z-axis, which represents the side spin. FIG. 7C shows the rotating body rotating around y-axis, which represents the rifle spin.

$$\text{top} \cdot \text{backspin} = \frac{\phi^*}{360°} \times \frac{60000}{t} \quad \text{Equation 10}$$

$$\text{side spin} = \frac{\psi^*}{360°} \times \frac{60000}{t} \quad \text{Equation 11}$$

$$\text{rifle spin} = \frac{\theta^*}{360°} \times \frac{60000}{t} \quad \text{Equation 12}$$

In operation S440, the top spin or back spin of the rotating body may be calculated using equation 10, the side spin of the rotating body may be calculated using equation 11, and the rifle spin may be calculated using equation 12. Here, the unit of the rotation variables $\phi^*$, $\theta^*$, and $\psi^*$ is degree, the unit of photographing interval t is millisecond (ms), and the unit of top spin, back spin, side spin, and rifle spin is revolution per minute (RPM).

$$n = \begin{pmatrix} n_x \\ n_y \\ n_z \end{pmatrix} \quad \text{Equation 13}$$

$$= \frac{1}{\sqrt{(r_{32} - r_{23})^2 + (r_{13} - r_{31})^2 + (r_{21} - r_{12})^2}} \begin{pmatrix} r_{32} - r_{23} \\ r_{13} - r_{31} \\ r_{21} - r_{12} \end{pmatrix}$$

$$w = a\cos\left(\frac{r_{11} + r_{22} + r_{33} - 1}{2}\right) \quad \text{Equation 14}$$

In operation S440, the rotation axis of the rotating body may be calculated using equation 13, and the rotation angle of the rotating body with respect to the rotation axis may be calculated using equation 14, where n is the rotation axis which is a unit vector satisfying $\|n\|=1$, and w is the rotation angle.

The method of measuring rotation characteristics of the rotating body according to the present invention has been described above. Hereinafter, the apparatus for measuring rotation characteristics of the rotating body according to the present invention will be described.

Figure 8:
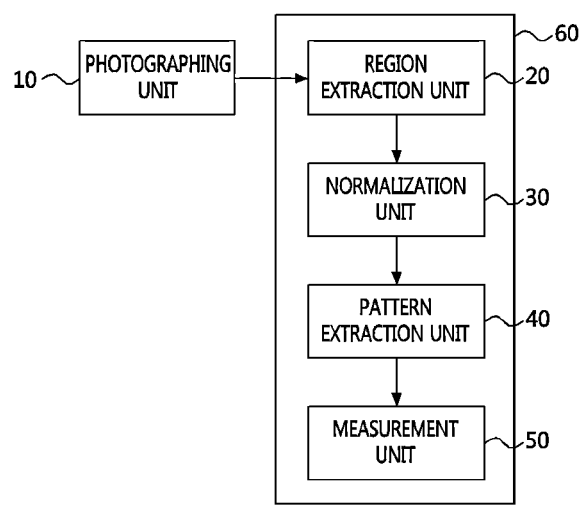
FIG. 8 is a block diagram showing an apparatus for measuring rotation characteristics of the rotating body according to an embodiment of the present invention.

FIG. 8 is a block diagram showing the apparatus for measuring rotation characteristics of the rotating body according to an embodiment of the present invention.

Referring to FIG. 8, the apparatus 60 for measuring rotation characteristics may include a region extraction unit 20, a normalization unit 30, a pattern extraction unit 40, and a measurement unit 50, and the system for measuring rotation characteristics may be a photographing unit 10 and the measurement apparatus 60.

In an embodiment of the present invention, the region extraction unit 20, the normalization unit 30, the pattern extraction unit 40, and the measurement unit 50 are disclosed independently of each other for convenience of description. However, the region extraction unit 20, the normalization unit 30, the pattern extraction unit 40, and the measurement unit 50 may be implemented in one form, physical device, or module. Alternatively, the region extraction unit 20, each of the normalization unit 30, the pattern extraction unit 40, and the measurement unit 50 may be implemented in a plurality of physical devices or groups instead of one physical device or group.

The photographing unit 10 is used to photograph the rotating body and may include a high-speed camera, a multi-exposure camera, etc. When the rotating body is photographed using the high-speed camera, at least two images may be photographed at certain intervals. When the rotating body is photographed using the multi-exposure camera, at least twice exposed images may be photographed at certain intervals.

The region extraction unit 20 extracts the rotating-body region on the basis of the image of the rotating body photographed in the photographing unit 10. To provide a detailed description, the region extraction unit 20 extracts a pixel cluster from the image of the photographed rotating body, estimates a center and radius of the rotating body on the basis of the extracted cluster, and detects the rotating-body region on the basis of the estimated center and radius of the rotating body. Here, the pixel cluster may be extracted through operation S110, the center and radius of the rotating body may be estimated through operation S120, and the rotating-body region may be detected through operation S130.

The normalization unit 30 normalizes the brightness range of the rotating-body region on the basis of the maximum brightness value and the minimum pixel brightness value among the brightness values of the pixels in the rotating-body region extracted by the region extraction unit 20 such that each pixel in the rotating-body region may have a brightness value ranging from 0 to 255. Here, the brightness range of the rotating-body region may be normalized through operation S200.

The pattern extraction unit 40 may extract the surface pattern of the rotating body on the basis of brightness comparison results of the rotating-body region extracted by the region extraction unit 20 or the rotating-body region normalized by the normalization unit 30. In this case, the surface pattern of the rotating body may be extracted applying the filter for calculating a result value according to comparison of the brightness values of the pixels. To provide a detailed description, the pattern extraction unit 40 may create the integration image of the rotating-body region or the normalized rotating-body region, and extract the surface pattern of the rotating body by applying the filter for calculating a result value according to the comparison of the brightness values of the pixels and the created integration image. Here, the integration image of the rotating-body region or the normalized rotating-region region may be created through S310, and the surface pattern of the rotating body may be extracted through S320.

The measurement unit 50 may measure rotation characteristics of the rotating body on the basis of change in the surface pattern extracted in the pattern extraction unit 40. The rotation characteristics may include top spin, back spin, side spin, rifle spin, rotation axis, rotation angle, etc. To provide a detailed description, the measurement unit 50 estimates a range of the rotation variable (here, a rotation angle) on the basis of the change in the surface pattern, calculates a rotation matrix on the basis of any rotation variable in the estimated range of rotation variable, calculates the rotation variable on the bases of the rotation matrix and a cost function, and calculates the rotation characteristics of the rotating body on the basis of the calculated rotation variable. Here, the range of the rotation variable may be estimated through S410, the rotation matrix may be calculated through S420, the rotation variable may be calculated through S430, and the rotation characteristics of the rotating body may be calculated through S440.

Accordingly, it is possible to accurately measure rotation characteristics, such as rotation rate, rotation axis and rotation angle of the rotating body, regardless of variation in brightness values of a surface region of the rotating body depending on illumination of a lamp, sensitivity of a camera, and exposure time of a camera.

In addition, it is possible to quickly measure rotation characteristics, such as rotation rate, rotation axis and rotation angle of the rotating body, by extracting surface pattern of the rotating body from surface region of the rotating body.

In addition, it is possible to accurately measure rotation characteristics, such as rotation rate, rotation axis and rotation angle of the rotating body, regardless of prior information about surface pattern of rotating body by extracting rotation characteristics of the rotating body on the basis of the change of the extracted surface pattern.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of measuring rotation characteristics, the method comprising:

extracting a rotating-body region from an image of a rotating body;

extracting a surface pattern of the rotating body on the basis of brightness values of pixels included in the extracted rotating-body region; and acquiring rotation characteristics of the rotating body on the basis of change in the extracted surface pattern, wherein the extracting of the surface pattern comprises:

normalizing a brightness range of the rotating-body region on the basis of a minimum brightness value and a maximum brightness value among the brightness values of the pixels included in the extracted rotating-body region;

creating an integration image by adding brightness values of pixels included in a certain portion of the normalized rotating-body region; and extracting the surface pattern of the rotating body on the basis of the integration image, wherein the integration image for the certain portion has a value $D(x_1, y_1, x_2, y_2)$ that is calculated using the following equations:

$$D(x_1, y_1, x_2, y_2) =$$
$$I(x_2, y_2) - I(x_2, y_1-1) - I(x_1-1, y_2) + I(x_1-1, y_1-1),$$
$$\text{and } I(x, y) = \sum_{u=x_0}^{x} \sum_{v=y_0}^{y} G(u, v),$$

wherein G (u, v) is a brightness value of a pixel located at coordinate (u, v), I(x, y) is a value obtained by adding brightness values of all pixels located in a region from coordinate ($x_0$, $y_0$) to coordinate (x, y), coordinate ($x_0$, $y_0$) is a coordinate of a specific point outside a surface region of the rotating body, and the certain portion is defined by coordinate ($x_1$, $y_1$) and coordinate ($x_2$, $y_2$).

2. The method of claim 1, wherein the extracting of the rotating-body region comprises:
   extracting a pixel cluster from the image of the rotating body;
   estimating a center and radius of the rotating body on the basis of the extracted pixel cluster; and
   extracting the rotating-body region on the basis of the estimated center and radius of the rotating body.

3. The method of claim 2, wherein the estimating of the center and radius of the rotating body is performed using a Hough transform-based circle fitting technique.

4. The method of claim 1, wherein the normalizing of the brightness range of the rotating-body region is performed on the basis of the minimum brightness value and the maximum brightness value among the brightness values of the pixels such that each pixel in the extracted rotating-body region has a brightness value ranging from 0 to 255.

5. The method of claim 1, wherein the extracting of the surface pattern further comprises:
   calculating a brightness comparison value and a brightness average value of the pixels included in the normalized rotating-body region using the created integration image; and
   extracting the surface pattern of the rotating body on the basis of the calculated brightness comparison value and brightness average value.

6. The method of claim 1, wherein the acquiring of the rotation characteristics comprises:
   estimating a rotation angle range on the basis of the change in the extracted surface pattern;
   calculating a rotation matrix on the basis of any rotation angle within the estimated rotation angle range;
   calculating a rotation angle having a minimum value of a cost function within the estimated rotation angle range on the basis of the rotation matrix; and
   acquiring the rotation characteristics of the rotating body on the basis of the calculated rotation angle.

7. The method of claim 1, wherein the rotation characteristics comprise at least one of top spin, back spin, side spin, rifle spin, rotation axis, and rotation angle of the rotating body.

8. An apparatus for measuring rotation characteristics, the apparatus comprising:
   a region extraction unit estimating a center and radius of a rotating body from an image of the photographed rotating body, and extracting a rotating-body region on the basis of the estimated center and radius;
   a normalization unit normalizing a brightness range of the rotating-body region on the basis of a minimum brightness value and a maximum brightness value among brightness values of pixels in the extracted rotating-body region;
   a pattern extraction unit extracting a surface pattern of the rotating body on the basis of the brightness values of the pixels in the extracted rotating-body region; and
   a measurement unit acquiring rotation characteristics of the rotating body on the basis of change in the extracted surface pattern,
   wherein the pattern extraction unit creates an integration image by adding brightness values of pixels included in a certain portion of the normalized rotating-body region, calculates a brightness comparison value and a brightness average value of the pixels included in the normalized rotating-body region using the created integration image, and extracts the surface pattern of the rotating body on the basis of the brightness comparison value and the brightness average value, and
   wherein the integration image for the certain portion has a value $D(x_1, y_1, x_2, y_2)$ that is calculated using the following equations:

$$D(x_1, y_1, x_2, y_2) =$$
$$I(x_2, y_2) - I(x_2, y_1-1) - I(x_1-1, y_2) + I(x_1-1, y_1-1),$$
$$\text{and } I(x, y) = \sum_{u=x_0}^{x} \sum_{v=y_0}^{y} G(u, v),$$

wherein G (u, v) is a brightness value of a pixel located at coordinate (u, v), I(x, y) is a value obtained by adding brightness values of all pixels located in a region from coordinate ($x_0$, $y_0$) to coordinate (x, y), coordinate ($x_0$, $y_0$) is a coordinate of a specific point outside a surface region of the rotating body, and the certain portion is defined by coordinate ($x_1$, $y_1$) and coordinate ($x_2$, $y_2$).

9. The apparatus of claim 8, wherein the region extraction unit extracts a pixel cluster from the image of the rotating body, estimates the center and radius of the rotating body on the basis of the extracted pixel cluster, and extracts the rotating-body region on the basis of the estimated center and radius of the rotating body.

10. The apparatus of claim 8, wherein the measurement unit estimates a rotation angle range on the basis of change in the extracted surface pattern, calculates a rotation matrix on the basis of any rotation angle within the estimated rotation angle range, calculates a rotation angle having a minimum value of a cost function within the estimated rotation angle range on the basis of the rotation matrix, and acquires the rotation characteristics of the rotating body on the calculated rotation angle.

11. A system for measuring rotation characteristics, the system comprising:
   a photographing unit acquiring a plurality of images of a rotating body; and
   an apparatus for measuring rotation characteristics extracting a rotating-body region from the acquired rotating body images, extracting a surface pattern of the rotating body on the basis of brightness values of pixels included in the extracted rotating-body region, and acquiring rotation characteristics of the rotating body on the basis of the surface pattern of the extracted rotating body,
   wherein the apparatus is configured to:

normalize a brightness range of the rotating-body region on the basis of a minimum brightness value and a maximum brightness value among the brightness values of the pixels included in the extracted rotating-body region;

create an integration image by adding brightness values of pixels included in a certain portion of the normalized rotating-body region; and extract the surface pattern of the rotating body on the basis of the integration image, wherein the integration image for the certain portion has a value $D(x_1, y_1, x_2, y_2)$ that is calculated using the following equations:

$$D(x_1, y_1, x_2, y_2) = I(x_2, y_2) - I(x_2, y_1 - 1) - I(x_1 - 1, y_2) + I(x_1 - 1, y_1 - 1),$$

$$\text{and } I(x, y) = \sum_{u=x_0}^{x} \sum_{v=y_0}^{y} G(u, v),$$

wherein $G(u, v)$ is a brightness value of a pixel located at coordinate $(u, v)$, $I(x, y)$ is a value obtained by adding brightness values of all pixels located in a region from coordinate $(x_0, y_0)$ to coordinate $(x, y)$, coordinate $(x_0, y_0)$ is a coordinate of a specific point outside a surface region of the rotating body, and the certain portion is defined by coordinate $(x_1, y_1)$ and coordinate $(x_2, y_2)$.

12. The system of claim 11, wherein the photographing unit acquires the plurality of images at a certain interval.

13. The system of claim 11, wherein the apparatus is configured to:

calculating a brightness comparison value and a brightness average value of the pixels included in the normalized rotating-body region using the created integration image; and extracting the surface pattern of the rotating body on the basis of the calculated brightness comparison value and brightness average value.

* * * * *